Patented Jan. 25, 1927.

1,615,448

UNITED STATES PATENT OFFICE.

ISAIAH FRANK, OF FLUSHING, NEW YORK.

RAY-FILTER GLASS.

No Drawing. Application filed July 6, 1925. Serial No. 41,897.

My invention relates to an improved filter glass designed primarily to be used as a ray filter in a lens or between a light source as a lens in front of the human eye, or interposed between a light source and the human eye, as a globe around an electric light or composing the glass from which such bulb is made, to relieve the human eye of the deleterious effects due to certain rays in the spectrum, of a wave length commonly known as ultra-violet and infra-red rays, and the purpose of my invention is to produce a glass which, while cutting off these invisible rays, will offer no greater obstruction of the rays in the visible portions of the spectrum than ordinary glass having similar commercial use, and also transmit such rays in the visible portion along a uniform ratio of transmission so as not to create any distortion, and to have the light given through such filter glass similar and practically the same as light transmitted through ordinary clear glass when used for similar purposes.

In addition to the utility of this glass in cutting off the invisible rays because of their ill effect upon the human eye, these invisible rays are also known to be the principally active or actinic rays of light which cause the fading, disintegration and other chemical effects in merchandise exposed to light, so that this filter glass is adapted for other uses such as store front windows and show cases and the like.

The essence of my invention comprises in incorporating in the batch from which the glass is manufactured a substance herein known as a filter chemical and which will serve in the finished glass to substantially cut off the invisible portion of the spectrum known as the ultra-violet, and partially cut off the infra-red rays, and then introducing some other substance which combined with the filter chemical, will cause the finished product to have the appearance and visibility transmitting power of clear glass for the corresponding commercial use, and yet in no way diminish the effectiveness of the glass upon the actinic rays.

A typical batch from which such glass can be made where the finished product is to be used for optical glasses having a final thickness of about 1½ millimeters in cross-section is as follows:—sand, about 210 lbs.; soda ash, about 96 lbs.; lime, about 37.5 lbs.; feldspar, about 10 lbs.; sodium nitrate, about 10 lbs.; manganese dioxide, about 15 oz.; ferric oxide, about 10 oz.

The glass batch above described may be worked up by any of the standard glass making processes. However, I prefer to bring the glass to a melt by that process known as the "closed pot process". In certain cases, however, where the ingredients used contain either one or both of the chemicals mentioned, the batch may be brought to a melt and the filter ingredients thereafter added, that is, any shortage of either the iron oxide or the manganese dioxide which may occur in the raw batch, may be made up or supplied subsequently after the batch has been melted and thereafter thoroughly incorporated.

Although I have given as my preferred proportions in a batch as above described 15 oz. of manganese dioxide to 10 oz. of ferric oxide which is added to a raw batch of substantially 264 lbs., in this example the mixture of manganese dioxide forms .00256 parts by weight of the mixture forming the raw batch and the ferric oxide is two thirds of this amount of the manganese dioxide. It will be observed that the proportion of .00256 parts by weight of the mixture forming the raw batch as above calculated is for optical glasses having a final thickness of about 1½ millimeters. To produce a filter glass of any given thickness, the amount of mixture may be varied in such inverse ratio in the batch from which such glass is made of substantially .00256 by weight of the mixture of manganese dioxide and ⅔ by weight of this amount of the latter ingredient of ferric oxide as the given thickness of the glass when finished for use bears to 1½ millimeters. This will give a finished article which is colorless when viewed from its polished surfaces and cuts off the ultra-violet light and a portion of the infra-red rays and transmits the visible spectrum undiminished. Thus it will be observed that what I have termed "the balanced mixture" may be added to a glass batch in quantities varying inversely with the thickness of the glass in its final form. It will also be understood that I include within the scope of my invention and the claims herein, variations covering a range to take care of the various tinctorial properties of the other ingredients used in the batch, which ingredients may be present due to impurities; or the proportions may also be varied due to the variations and combining powers which the mixture may have with the other materials which are used to make up the glass batch so as to take care of glasses known in the art as lead glass, soda glass, borax glass, or any other glass.

In the claims, by the term "balanced mixture" I mean to include not only the preferred ratio of manganese dioxide to ferric oxide which I have found gives the actinic light ray absorbing qualities above-mentioned, but also mean to include such variations of manganese dioxide to iron oxide as will take care of the variations of the character or composition of the other materials in the batch that are used.

A glass made in accordance with my invention has light ray transmitting properties of the visible spectrum substantially equal to glass having corresponding commercial uses, for instance, an optical glass as now practiced by the art has a light ray transmitting property of substantially 91% of the visible spectrum.

Optical glass made in accordance with my invention, will have substantially the same light transmitting properties, namely, about 90%.

I believe I am the first to produce an apparently colorless ray filter glass capable of absorbing the ultra-violet and infra-red rays, without appreciable diminution of transmission of the rays of light in the visible portion of the spectrum, and which may be obtained by using common ingredients which do not increase the cost of the finished product over that of ordinary commercial glass for similar commercial uses, and I intend to claim the same broadly.

This application is filed as a substitute for my application filed August 1st, 1919, Patent Office File No. 314,751.

Having thus described my invention and illustrated its use, what I claim as new and desire to secure by Letters Patent is:

1. In the art of making glass for the manufacture of ray filters, the method which comprises adding manganese dioxide and ferric oxide to a batch for making glass in such proportions that the ferric oxide substantially neutralizes the color effect of the manganese dioxide without impairing its absorbing characteristics for ultra-violet and infra-red rays, whereby the glass is substantially colorless in commercial thicknesses and is capable of absorbing the greater portion of the ultra-violet and infra-red rays without appreciably reducing the normal high uniform transmission in the visible parts of the spectrum, such proportions being in the case of lenses, approximately 1½ millimeters thick, .00256 by weight in the batch from which such glass is made of a mixture of manganese dioxide and two-thirds of the amount by weight of the last mentioned ingredient of ferric oxide.

2. A ray filtering glass which contains manganese dioxide neutralized by ferric oxide combined in such proportions that the filter is substantially colorless in commercial thicknesses and is capable of absorbing the greater portion of the ultra-violet and infra-red rays without appreciably reducing the normal high uniform transmission in the visible parts of the spectrum, such proportions being in the case of ophthalmic lenses, 1½ millimeters thick, .00256 by weight of manganese dioxide and two-thirds of the amount by weight of the last mentioned ingredient of ferric oxide in the batch from which such glass is made.

3. In a ray filter glass of any given thickness, containing a quantity of manganese dioxide and ferric oxide in such inverse ratio, in the batch from which such glass is made of substantially .00256 by weight of the mixture of manganese dioxide, and two-thirds of this amount of manganese dioxide by weight of ferric oxide; as the given thickness of the glass when finished for use bears to 1½ millimeters, whereby the finished article is colorless when viewed from its polished surfaces and cuts off the ultra-violet light, and a portion of the infra-red rays, and transmits the visible spectrum undiminished.

4. A ray filter glass which when made into an article of a thickness of one and one-half millimeters when ready for use containing a quantity of manganese dioxide and ferric oxide in the batch from which such glass is made of substantially .00256 by weight of manganese dioxide and two-thirds of this amount by weight of ferric oxide and with varying thicknesses of glass when ready for use contains a varying quantity of manganese dioxide and ferric oxide in the inverse ratio to such amounts above stated as the thickness of such filter glass when ready for use bears to one and one-half millimeters.

In witness whereof, I have signed this specification, this 1st day of July, 1925.

ISAIAH FRANK.